April 21, 1959     H. R. HASTINGS ET AL     2,883,623
ELECTROMAGNETIC INDICATING INSTRUMENTS
Filed Sept. 13, 1955
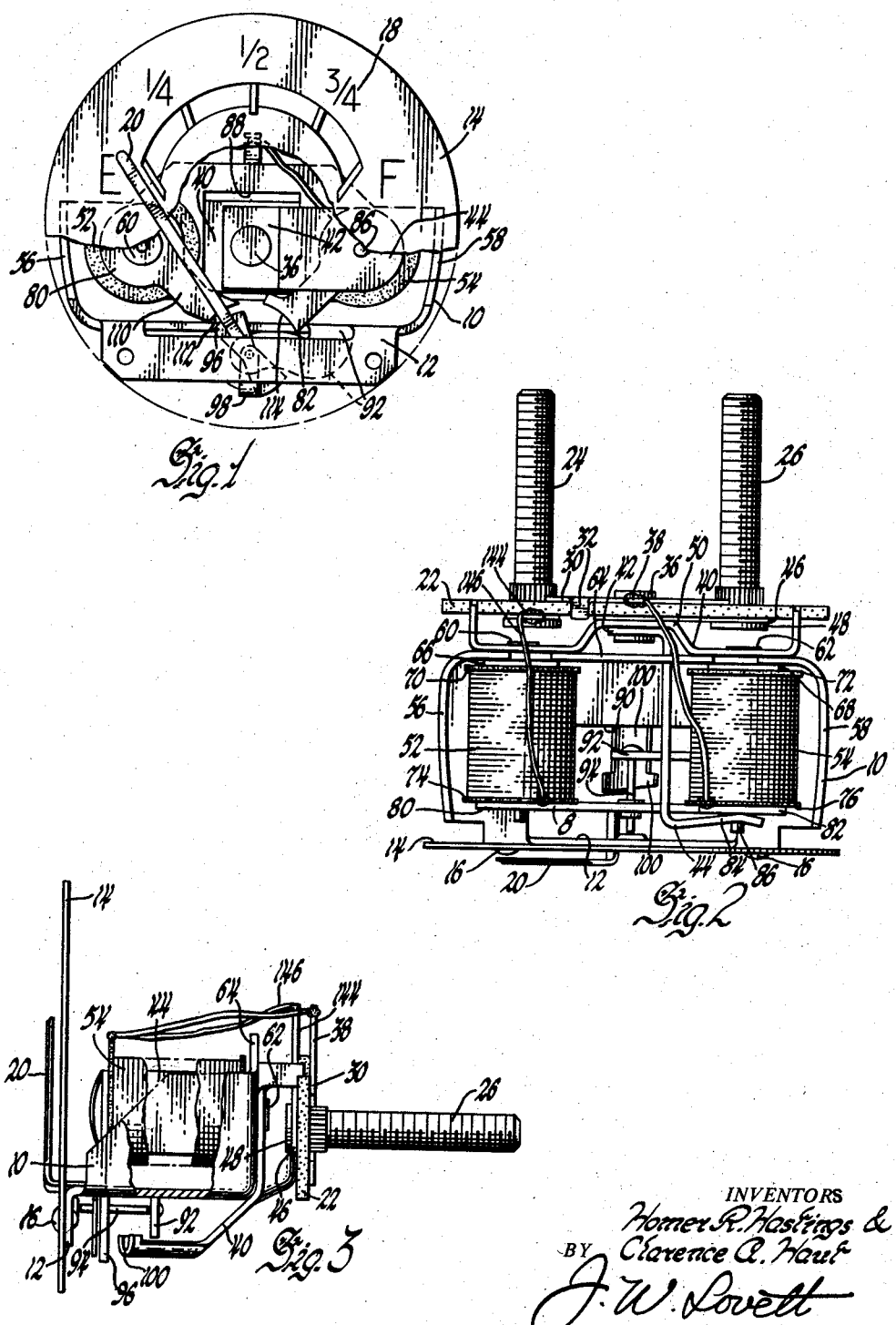
INVENTORS
Homer R. Hastings &
Clarence A. Hauf
BY
J. W. Lovett
ATTORNEY April 21, 1959     H. R. HASTINGS ET AL     2,883,623
ELECTROMAGNETIC INDICATING INSTRUMENTS
Filed Sept. 13, 1955     2 Sheets-Sheet 2
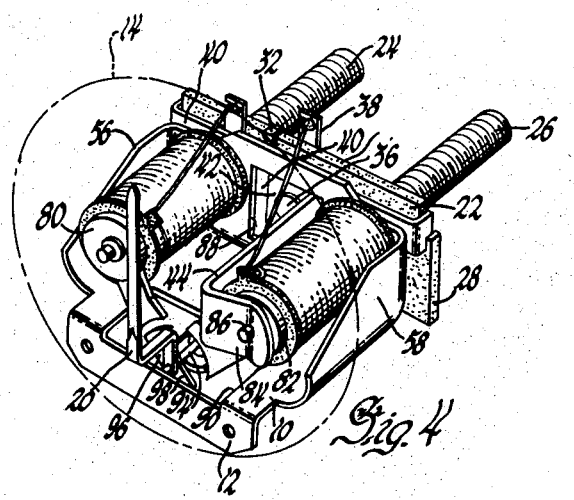
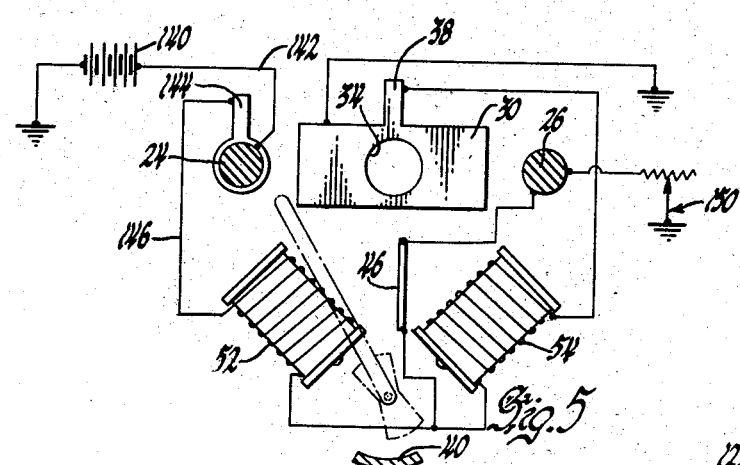
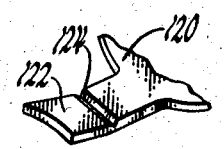
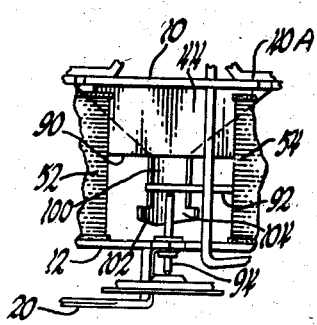
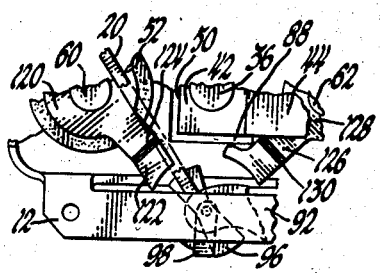
INVENTORS
Homer R. Hastings &
Clarence A. Haut
BY J. W. Lovett
ATTORNEY

United States Patent Office 2,883,623
Patented Apr. 21, 1959

2,883,623
ELECTROMAGNETIC INDICATING INSTRUMENTS

Homer R. Hastings and Clarence A. Haut, Flint, Mich., assignors to General Motors Corporation, Detroit, Mich., a corporation of Delaware Application September 13, 1955, Serial No. 534,076

2 Claims. (Cl. 324—140)

This invention relates to electrical indicating instruments and more particularly to indicating instruments of the electromagnetic gauge type such as used to function as fuel supply gauges or temperature indicators.

In devices of the type herein considered, torque exerted on an armature serves to deflect an indicating device such as a pointer with respect to a scale on a dial. With improvements made in magnetic circuits in recent years to gain a strong pointer movement, accurate reading of the instruments or definite and reliable positioning of the pointer is dependent upon proper calibration which is more difficult to secure. With a high flux exerted on the armature and small air gaps, it is very desirable to provide ample provision for adjustment of the air gaps to suit any given conditions. In some instruments the change in reading should be uniform over the entire scale on the dial when a change in the effect to be measured is uniform and this is true in most instances and often with reference to gasoline gauges on automobiles. Sometimes, however, a given portion of the scale reading should be emphasized as in temperature gauges and this demands increased latitude in calibration provisions.

The class of instruments herein broadly considered are similar to those disclosed in the United States Letters Patents 1,674,688 granted June 26, 1928, in the name of McCoy and 1,791,786 granted February 10, 1931, in the name of Bacon. Two actuating electromagnetic coils are so mounted on a frame in such instruments as to create cross fields with a resultant force acting upon an armature. The armature will take a position in the magnetic fields created by the coils in which the components of force will balance. This position will bear a relation to what is to be measured or indicated—will indicate a state or effect controlling a variable resistance to current passing through one of the coils. Calibration of the instrument is had by varying the relative position or length of the air gaps provided between the armature and the end plates of the coils. These prior devices could not be calibrated as easily or expeditiously as would be desirable particularly if the circuits are designed for a pointer movement of increased strength. A strong pointer movement is advantageous in that it permits a wide selection of indicators such as flags for styling effects and also because the reading is more reliable.

An object of the present invention is to provide an improved indicating instrument with provision for ease in calibration despite a strong pointer movement.

Another object is to provide an indicating instrument of strong torque characteristics and which may readily be calibrated to secure uniform or non-uniform indicator movement corresponding to an effect being measured.

To these ends, a feature of the present invention relates to an arrangement of electromagnetic coils, an armature and pole pieces, at least one of the latter having a tongue readily distorted as desired for calibration purposes. Another feature pertains to a pole piece having an attenuated section. Another feature resides in a field piece with an edge inclined toward one end of an armature. Still another feature pertains to a field piece with intersecting edges spaced from one end of an armature.

These and other important features of the invention will now be described in detail in the specification and then pointed out more particularly in the appended claims.

In the drawings:

Fig. 1 is a front elevation of a fuel gauge with its dial partially broken away and embodying features of the present invention;

Fig. 2 is a plan view of the gauge shown in Fig. 1;

Fig. 3 is a side view of the gauge shown in Figs. 1 and 2 with a portion of the frame broken away;

Fig. 4 is a perspective view of the gauge with the dial shown in dot-and-dash lines;

Fig. 5 is a diagrammatic view showing the electrical circuit employed;

Fig. 6 is a plan view of the central portion of the instrument shown in Fig. 4 but showing a modified field piece construction;

Fig. 7 is a front view of portions of elements shown in Fig. 6; and

Fig. 8 is a perspective view of a portion of a pole piece illustrated in Fig. 7.

The instrument as disclosed in the drawings comprises a fuel gauge adapted to be mounted on a panel or in a casing. Advantageously, the instrument comprises a brass frame 10 having a flange 12 to which is attached an aluminum dial 14 by means of rivets 16. The dial is provided with insignia 18 graduated from an E or Empty position to an F or Full position. The dial is also provided with an arcuate opening, not shown in the drawings, to accommodate a pointer 20. The instrument is supported by means of a back plate 22 formed of insulating material and through which pass two binding posts 24 and 26. The back plate 22 extends from each side as at 28 to engage a support such as a casing so that the dial 14, as well as other parts of the instrument, are maintained clear of any ground connection. A grounding plate 30 is attached to the back of the insulating plate 22 by tabs such as the tab 32 crimped around the opposed edges of the plate 22. This grounding plate is also apertured as at 34 (Fig. 5) to avoid contact with a central rivet 36. The grounding plate is also so made as to be spaced from the two binding posts 24 and 26. A tab 38 is made integral with the plate 30 for connection in the electrical circuit as will further appear.

A field plate or third pole piece 40 and one end 42 of a temperature compensator 44 are fixed to the insulator plate 22 by the rivet 36. On the front side of the plate 22 is a conductor plate 46, one end of which is held between a head 48 of the post 26 and the plate 22. The other end of the conductor plate 46 is interposed between the plate 22 and a central portion 50 (Fig. 2) of the field plate 40 and is held in place because of the rivet 36.

Two parallel electromagnetic coils 52 and 54 are located within the brass frame 10. The sides 56 and 58 of the frame curve upwardly and partially shield the coils. The coils are fixed to the field plate 40 by means of cores 60 and 62. These cores are riveted to hold them in place and they pass through the back wall 64 of the frame as well as through two washers 66 and 68 located between the coils and the wall. The wiring of the coil 52 is insulated from the washer 66 by a paper insulator 70. A similar insulator 72 is employed with relation to coil 54. The forward ends of the coils 52 and 54 bear insulating or paper washers 74 and 76 respectively. The forward ends of the cores 60 and 62 are peened over to retain two pole pieces 80 and 82 respectively.

The temperature compensator 44 is Z-shaped and its forward end 84 is so placed as to receive the end 86 of the core 62. Such a device is disclosed in the United States Patent 2,668,944 granted February 9, 1954, in the name of Schwynn and Mitchel and entitled "Temperature Compensator Alloy."

The back wall 64 of the brass frame is recessed as at 88 to present clearance around the rear end portion of the temperature compensator 44. The present invention does not include the compensator and further description thereof is, therefore, not deemed essential herein.

The bottom of the brass frame 10 is provided with a rectangular opening 90 and a portion of the frame extends downwardly therefrom and is in the form of an arm 92. A spindle 94 is pivotally mounted with respect to and between the arm 92 and the flange 12 of the frame.

This spindle bears an armature 96, the pointer 20 and a brass counter weight 98. The latter element is so placed on the spindle that with no current going through the instrument the pointer 20 will be biased toward the empty or E position.

The field piece 40 extends forwardly to terminate in a curved edge 100 spaced from one end of the armature 98 but inclined thereto.

In Fig. 6 the field or third pole piece 40A is substituted for the field piece of Fig. 2 and presents two intersecting edges 102 and 104 which are inclined toward the armature and spaced therefrom. This arrangement assures a more accurate positioning of the pointer when the latter should indicate that the fuel tank being served is half full.

The pole pieces 80 and 82 are made of ductile material so that they may be easily deformed and yet retain their shape during service. The pole piece 80, as viewed in Fig. 1, has an integral tongue 110 extending downwardly toward the right and toward the armature and has a curved edge 112 which is concentric with the armature.

The pole piece 82, as viewed in Fig. 1, is provided with a tongue which extends downwardly to the left to terminate in an edge 114 also concentric with the armature. It will be appreciated that the main portions of the pole pieces 80 and 82 lie in substantially the same plane as the armature 96 which is thin and flat in form.

Fig. 7 shows a modified form for the pole pieces. In that figure a left-hand pole piece 120 is shown with a modified tongue 122 which is attenuated. A different form of tongue 126 is integral with the right-hand pole piece 128 and this tongue is attenuated at 130. Fig. 8 shows a groove 124 as a form of attenuation.

Fig. 5 shows the circuits employed in which current is derived from a battery 140 and directed by way of a line 142 to the post 24. This current is directed by way of a terminal element 144 and a line 146 to the forward end of the coil 52. This current is then directed through the coil 52 and is divided. Considered along the direction of the wire, the coils are wound in opposite directions to give the pole pieces 80 and 82 the same polarity. Part of the current goes through the coil 54 and plate 30 to ground and part of it goes through the conductor plate 46 and the terminal post 26 to the instrument comprising the sending unit 150 from which the effect to be measured originates.

As stated heretofore, the pole pieces 80 and 82 are spaced apart around the armature an angular distance of about 90°. If current is the same at any given instance through the two coils, the pointer 20 will assume a given position. If current is increased in one of the coils because of the variable resistance in the sending unit 150, that coil will have more influence or effect on the armature which will move from the given position and assume a new position corresponding with the new resultant of the forces developed by the two coils.

Calibration of the instrument is easily performed by bending the tongues of the pole pieces 80 and 82 or 120 and 128 toward or away from the gauge dial 14 or from the plane of the armature thereby effectively changing the air gaps between the pole pieces and the ends of the armature. This means of calibration is simple and quickly performed.

The armature, pole pieces and third pole or field piece are preferably made of Armco iron but they may be made of other materials characterized by high permeability and low hysteresis loss. As stated heretofore, the pole pieces should be of ductile material to permit their distortion for adjustment in bringing about calibration.

The frame 40 must be rigid and be of a material with low permeability and either brass or aluminum is suitable.

The balance weight 98 is conveniently made of brass but various other materials may be substituted therefor as it has no effect electrically.

The coil insulators 70, 72, 74 and 76 are preferably of vulcanized material but any insulating material may be used for the purpose.

The washer 66 or 68 at the end of each coil is made of Armco iron but it could be of brass or of insulating material suitable and convenient in holding the coil together during the coil winding operation.

In the construction of Fig. 1, the tongue 110 is so shaped or contoured to cooperate with the armature 96 as to be effective in accurately positioning the pointer with respect to the E or Empty reading of the instrument. The right-hand tongue is so shaped as to be effective in positioning the pointer accurately with respect to the three-quarter and full or F reading of the instrument.

We claim:

1. An electrical indicating instrument including a pointer, a nonmagnetic frame, two electromagnetic coils having cores fixed to said frame and arranged substantially 90 degrees apart about a given axis parallel with said cores, an elongated flat armature, means pivoted on said frame to rotate on said given axis and supporting said pointer and armature, a flat, ductile pole piece fixed to the end of each core and having a portion of reduced width in the form of a tongue extending toward said axis, said portion or tongue having an attenuated section, a third ductile pole piece fixed to said frame with an edge adjacent and inclined to a surface of one end of said armature more definitely to position said pointer by effect on said armature, said three pole pieces and armature being of magnetic material, the pole piece of each core and said flat armature lying substantially in a single plane normal to said axis, the arrangement being such that calibration of the instrument may be effected by manual movement of the end of the pole piece of each core with relation to said single plane to vary the air gap between that pole piece and the said armature, and the said movement being facilitated by virtue of said attenuated section.

2. An instrument such as set forth in claim 1 in which the third pole piece presents two intersecting edges adjacent to and spaced from the armature, and the said two edges diverge in directions away from said armature to effect a more definite rotative positioning of the armature and pointer under certain conditions.

References Cited in the file of this patent

UNITED STATES PATENTS

| | | |
|---|---|---|
| 1,545,776 | Kaisling | July 14, 1925 |
| 1,952,160 | Faus | Mar. 27, 1934 |
| 2,015,474 | Hartley | Sept. 24, 1935 |
| 2,507,801 | Middleton | May 16, 1950 |
| 2,554,978 | De Giers | May 29, 1951 |
| 2,741,743 | Kern | Apr. 10, 1956 |